March 11, 1930.  H. E. ALTGELT  1,749,964
DIFFERENTIAL MECHANISM
Filed March 9, 1928
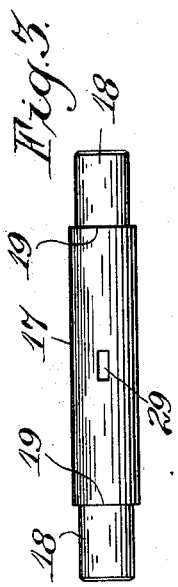
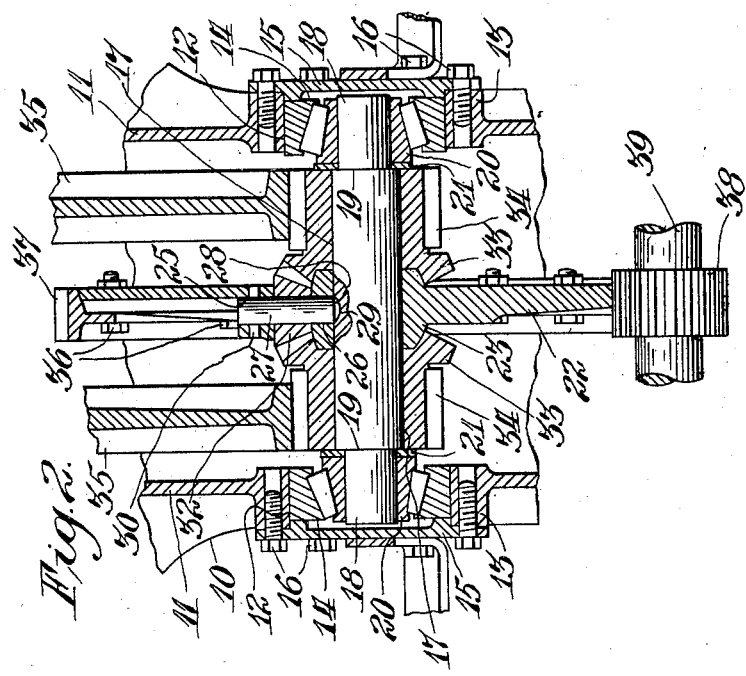
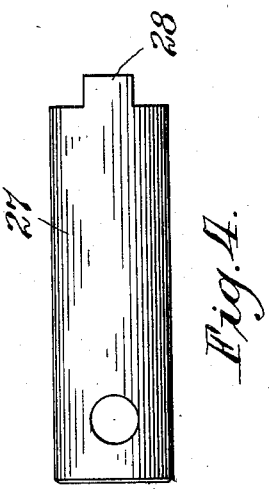
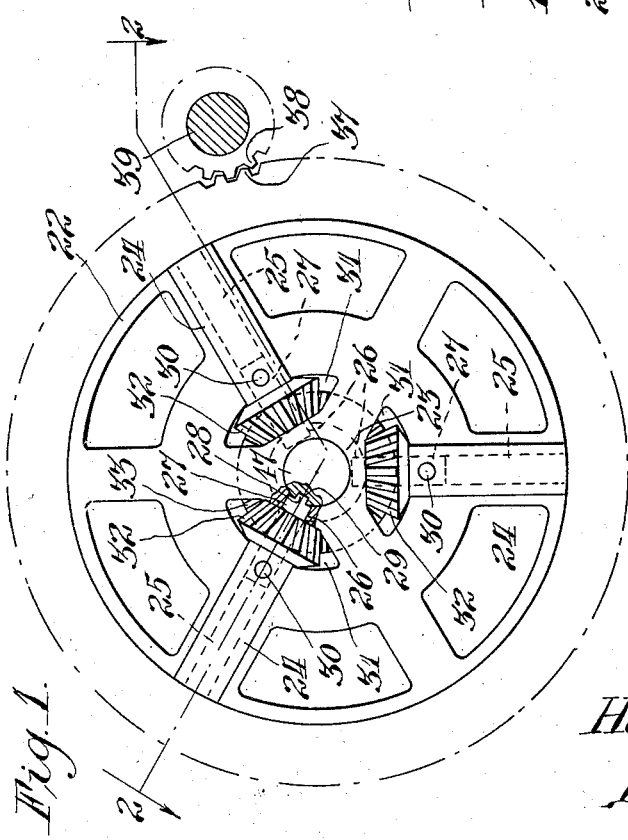
Inventor.
Herman E. Altgelt,
By John P. Smith
Atty.

Patented Mar. 11, 1930

1,749,964

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

DIFFERENTIAL MECHANISM

Application filed March 9, 1928. Serial No. 260,179.

One of the objects of the present invention is to provide a novel and improved differential mechanism which is simple in construction and efficient in operation.

A further object of the invention is to provide a differential mechanism for a self propelled vehicle, in which the number of parts thereof is reduced to a minimum, and in which the shaft which supports the differential mechanism revolves with the differential spider, so that the bearings of the spider are spaced at substantial distances apart, thereby, insuring a proper meshing and alignment of the gears forming the differential mechanism.

A still further object of the invention is to provide a differential mechanism for a self propelled vehicle, in which one of the pinion shafts which supports one of the bevelled pinions of the differential mechanism, is utilized for locking the differential spider to the differential shaft.

These and other objects are accomplished by providing a construction and arrangement of the various parts in the manner hereinafter described, and particularly pointed out in the appended claims.

Referring to the drawings, Fig. 1 is a side elevational view of my differential mechanism, with a portion thereof shown in cross section.

Fig. 2 is a cross sectional view taken on the lines 2—2 in Fig. 1.

Fig. 3 is a top plan view of the differential shaft and

Fig. 4 is an enlarged, detailed, side elevational view showing the construction of one of the pins for supporting one of the differential pinions, which also serves at the same time, for keying the differential spider to the shaft.

In illustrating one form of my invention, I have shown the same in connection with a fragmentary portion of a transmission housing of a self propelled vehicle, generally indicated by the reference character 10, which is more completely illustrated and described in my co-pending application Serial No. 260,871, filed 12th day of March, 1928. This housing construction comprises two oppositely disposed side walls 11, which are provided with two aligned apertures 12, which in turn have laterally projecting annular flanges 13. Mounted in these apertures 13 in the opposite side walls of the housing, are two anti-friction bearings 14 which are retained in the housing by means of cover plates 15, secured to the outside of the housing by means of bolts 16. Journalled in the housing by means of the anti-friction bearing members 14, is a differential shaft 17, which has its outer ends as shown at 18 slightly reduced in diameter, so as to form shoulders 19, adjacent the outer ends thereof. These reduced portions 18 are mounted in the inner races 20 of the anti-friction bearing members 14.

The inner sides of these inner races 20 abut against the washers 21, which in turn abut against the shoulders 19 of the shaft 17.

Mounted centrally of the differential shaft 17, and secured thereto, is a differential spider 22 which is provided with a hub portion 23 embracing the shaft. The spider 22 has formed integrally therewith, three equally spaced apart and radially extending barrel portions 24. These barrel portions 24 are provided with radially extending bores 25. In alignment with the bores 25 of the barrel portions 24, are circular recesses 26 formed in the hub 23 of the spider 22. Mounted in each of the bores 25 of the barrel portions 24 are pinion shaft 27, which have their inner ends extending into the recesses 26 in the hub 23 of the differential spider 22.

One of the pinion shafts 27 has formed integrally therewith, on one end thereof, an inwardly projecting key portion 28, which is adapted to engage or seat itself in a keyway 29 formed on one side of the differential shaft 17 for locking or securing the differential spider 22 to the differential shaft 17. Each of these pinion shafts is secured in the spider by means of pins 30. Journalled on the pinion shafts in three spaced apart openings 31 in the differential spider, are differential pinions 32, which are adapted to mesh with or operatively drive two oppositely disposed differential bevel gears 33.

Each of these bevel gears 33 has formed integrally therewith spur gears 34. These bevel and spur gears are journalled on the differential shaft 17, and occupy the spaces on the opposite sides of the differential spider 22, between the hub 23 of the differential spider 22, and the washers 21.

Each of the spur gears 34 meshes with and operatively drives the rear axle gears 35, which are secured to the rear axle (not shown) of the self propelled vehicle. Secured to the spider 22 by means of bolts 36 is a differential gear ring 37, which meshes with a pinion 38 secured to a transmission shaft 39.

The shaft 27 and the keyway 29 of the differential shaft 17 are so constructed as to permit a limited lateral movement of the spider 22 with respect to the differential shaft 17, so that the spider may move sideways in order to properly adjust the meshing relation between the differential pinions 32 and the bevel gears 33, and thereby assure a proper operative adjustment between these moving parts.

It will be apparent from the above construction, that by the utilization of one of the pinion shafts for securing the differential spider to the differential shaft, that I have reduced the number of parts which have been found heretofore necessary in making up or constructing an efficient differential mechanism; and it will be further noted that by having the differential shaft revolve as though it were essentially a part of the differential spider, it has enabled the spacing of the bearings of the shaft at a substantial distance apart, so that the differential mechanism is prevented from becoming dis-aligned, and thereby maintains the proper meshing relation of all the differential gears, as well as the gears which transmit their power to the main gears of the rear axle.

While in the above specification, I have described one embodiment which my invention may assume in practice, it will of course be understood that the same is capable of modification, and modification may be made without departing from the spirit and scope of the invention as expressed in the following claims.

What I claim as my invention and desire to secure by Letters Patent is:

1. A differential mechanism comprising a shaft, a differential spider secured to said shaft, differential bevel and spur gears journalled on said shaft, and mounted on the opposite sides of said spider, differential pinions journalled in said spider and meshing with the bevel gears on said shaft, pinion shafts secured to said spider on which said differential pinions are journalled, and means for securing said differential spider to said differential shaft by one of said pinion shafts.

2. A differential mechanism comprising a shaft, a differential spider secured to said shaft, differential bevel and spur gears journalled on said shaft, and mounted on the opposite sides of said spider, differential pinions journalled in said spider and meshing with the bevel gears on said shaft, pinion shafts secured to said spider on which said differential pinions are journalled, and means formed on the inner end of one of said pinion shafts and engageable with said differential shaft, for securing said differential spider to said differential shaft.

3. A differential mechanism comprising a shaft, a differential spider secured to said shaft, differential bevel and spur gears journalled on said shaft, and mounted on the opposite sides of said spider, differential pinions journalled in said spider and meshing with the bevel gears on said shaft, pinion shafts secured to said spider on which said differential pinions are journalled, and a key associated with the inner end of one of said pinion shafts and engageable with a keyway formed in said differential shaft for securing said differential spider to said differential shaft.

4. A differential mechanism comprising a shaft, a differential spider secured to said shaft, differential bevel and spur gears journalled on said shaft and located on the opposite sides of said spider, differential pinions journalled on said spider and meshing with the bevel gears on the opposite sides of said spider, there being a longitudinally extending keyway formed in said differential shaft, radially extending pinion shafts secured to said spider on which said differential pinions are journalled, and a transversely extending key formed integrally with one of said pinion shafts, and engageable with the keyway formed in said differential shaft for securing said spider to said differential shaft, and for permitting a limited lateral movement of said spider, longitudinally of said differential shaft.

5. A differential mechanism for a self propelled vehicle, comprising a differential shaft, a differential spider secured to said shaft, having a relatively wide bearing hub and radially extending barrels formed integrally therewith, there being radially extending bores formed in said barrels, said hub having circular recesses formed therein registering with the bore in said barrels, bevelled and spur gears journaled on said shafts and located on the opposite sides of said spider, there being spaced apart openings in said spider, adjacent to said hub, differential pinions mounted in said openings, meshing with the bevel gears on said differential shaft, pinion shafts mounted in the bores formed in said barrels and extending into the circular recesses formed in the hub of said spider, and means formed integrally with one of said pinion shafts and engageable with said differential shaft for securing said spider to said differential shaft.

6. The combination with a differential and transmission housing for a self propelled vehicle having oppositely disposed side walls, a differential shaft journalled in the side walls of said housing, a differential spider secured to said shaft, differential bevel and spur gears mounted on the opposite sides of said differential spider and between the side walls of said housing, said differential bevel and spur gears journalled on said differential shaft, differential pinions journalled in said spider and engageable with the bevel gears on said differential shaft, pinion shafts secured to said spider, on which said differential pinions are journalled, and an inwardly extending projection formed on one of said pinion shafts and slidably engageable with said differential shaft for securing said spider to said differential shaft.

7. The combination with a transmission and differential housing of a self propelled vehicle having oppositely disposed side walls, a differential shaft journalled in relatively spaced apart anti-friction bearings mounted in the side walls of said housing, a differential spider secured to said differential shaft, differential bevel and spur gears mounted on the opposite sides of and occupying the space between the hub of said differential spider and each of said anti-friction bearings, differential pinions journalled in said differential spider, and engaging the bevel gears on said differential shaft, pinion shafts secured to said spider on which said pinions are journalled, there being a keyway formed in said differential shaft, and a key formed integrally with one of said pinion shafts and engaging the keyway in said differential shaft, for securing said spider to said differential shaft, and permitting a limited lateral movement of said spider with respect to said differential shaft.

8. A differential mechanism comprising a shaft, a differential spider secured to said shaft, differential gearing journalled on said shaft and mounted on the opposite sides of said spider, differential gearing journalled on said spider and operatively related to the gearing on said shaft, a plurality of shafts secured to said spider on which said differential gearing is journalled, and means formed on one of said last named shafts and engageable with said differential shaft for securing said spider to said differential shaft.

9. The combination with a differential and transmission housing for a self propelled vehicle having oppositely disposed side walls, a differential shaft journalled in the side walls of said housing forming relatively spaced apart bearings for said shaft, a spider secured to said shaft, differential pinions journalled on said spider and laterally movable means forming the journal connection for one of said pinions and engageable with said differential shaft for securing said spider to said shaft.

10. The combination with a differential and transmission housing for a self propelled vehicle having two oppositely disposed and relatively spaced apart side walls, aligned apertures in the side walls of said housing, anti-friction bearings mounted in said apertures, a differential shaft journalled in said anti-friction bearings, a differential frame secured to said shaft, a plurality of bevelled pinions journalled in said frame, gearing mounted on said shaft and meshing with the pinions carried by said frame, shafts carried by said frame on which said pinions are journalled, one of said shafts engageable with said differential shaft for securing said frame to said differential shaft, and means for permitting a limited lateral movement of said frame longitudinally of said shaft.

In testimony whereof I have signed my name to this specification, on this 5th day of March, A. D. 1928.

HERMAN E. ALTGELT.